(12) United States Patent
Cheng et al.

(10) Patent No.: US 9,400,368 B2
(45) Date of Patent: Jul. 26, 2016

(54) LENS STRUCTURE

(71) Applicant: ABILITY ENTERPRISE CO., LTD., Taipei (TW)

(72) Inventors: Wen-Chieh Cheng, Taipei (TW); Hsiang-Yu Tsai, Taipei (TW)

(73) Assignee: ABILITY ENTERPRISE CO., LTD., Taipei (TW)

( * ) Notice: Subject to any disclaimer, the term of this patent is extended or adjusted under 35 U.S.C. 154(b) by 150 days.

(21) Appl. No.: 13/708,581

(22) Filed: Dec. 7, 2012

(65) Prior Publication Data

US 2013/0148216 A1    Jun. 13, 2013

(30) Foreign Application Priority Data

Dec. 7, 2011    (TW) .................................. 100145154

(51) Int. Cl.
*G02B 7/02* (2006.01)
*G02B 7/04* (2006.01)
*G02B 7/10* (2006.01)

(52) U.S. Cl.
CPC ... *G02B 7/04* (2013.01); *G02B 7/10* (2013.01)

(58) Field of Classification Search
CPC .......... G02B 7/02; G02B 7/021; G02B 7/022; G02B 7/023; G02B 7/026; G02B 7/04; G02B 7/10
USPC ................... 359/699–702, 823, 825, 703, 704
See application file for complete search history.

(56) References Cited

U.S. PATENT DOCUMENTS

| | | | | |
|---|---|---|---|---|
| 3,163,701 A * | 12/1964 | Staubach | ...................... | 359/703 |
| 4,229,074 A * | 10/1980 | Nonogaki | ..................... | 359/701 |
| 4,322,150 A * | 3/1982 | Kamata et al. | .................. | 396/79 |
| 5,648,876 A * | 7/1997 | Tanioka | ........................ | 359/701 |
| 5,661,609 A * | 8/1997 | Asakura et al. | ............... | 359/826 |
| 5,739,963 A * | 4/1998 | Kato | .............................. | 359/704 |
| 6,072,639 A * | 6/2000 | Onda | ............................. | 359/694 |
| 6,101,335 A * | 8/2000 | Onda | ............................. | 396/79 |
| 7,035,535 B2 | 4/2006 | Nomura | | |
| 7,130,132 B2 * | 10/2006 | Lee | ................................ | 359/704 |

(Continued)

FOREIGN PATENT DOCUMENTS

| CN | 100487551 C | 5/2009 |
|---|---|---|
| JP | 2008-249982 A | 10/2008 |
| TW | I233511 B | 6/2005 |

OTHER PUBLICATIONS

Office Action issued by Taiwan Intellectual Property Office on Mar. 3, 2014.

(Continued)

*Primary Examiner* — Bumsuk Won
*Assistant Examiner* — Collin X Beatty
(74) *Attorney, Agent, or Firm* — Rabin & Berdo, P.C.

(57) ABSTRACT

A lens structure is provided. The lens structure comprises a first barrel, at least one guider and a second barrel. The first barrel has a first groove, and comprises a first pin. The guider is slidably set to the first groove. The guider comprises a main body, a first limiting portion and a second limit portion. The main body has a first end and a second end opposite to the first end. The first limiting portion is connected to the main body and located between the first end and the second end. The second limiting portion is connected to the second end. The second barrel moves with the guider through the first limiting portion and has a second groove to which the first pin of the first barrel is set.

19 Claims, 7 Drawing Sheets

(56) References Cited

U.S. PATENT DOCUMENTS

| | | | |
|---|---|---|---|
| 7,301,577 B2 * | 11/2007 | Sakamoto | 348/340 |
| 7,391,965 B2 * | 6/2008 | Noguchi | 396/72 |
| 7,506,422 B2 | 3/2009 | Chao et al. | |
| 7,554,754 B2 | 6/2009 | Miyazawa et al. | |
| 7,719,775 B2 * | 5/2010 | Kudoh | 359/699 |
| 8,520,319 B2 * | 8/2013 | Kim et al. | 359/701 |
| 2003/0072090 A1 * | 4/2003 | Yasutomi | 359/701 |
| 2003/0081325 A1 | 5/2003 | Nomura et al. | |
| 2003/0227560 A1 * | 12/2003 | Mattsson | G02B 7/022 348/335 |
| 2003/0234986 A1 * | 12/2003 | Takagi et al. | 359/700 |
| 2004/0114257 A1 * | 6/2004 | Tanaka et al. | 359/819 |
| 2004/0196573 A1 * | 10/2004 | Nomura et al. | 359/700 |
| 2004/0207931 A1 * | 10/2004 | Lee | 359/704 |
| 2004/0228006 A1 * | 11/2004 | Yasutomi et al. | 359/699 |
| 2005/0278916 A1 | 12/2005 | Chao et al. | |
| 2005/0286142 A1 * | 12/2005 | Inamoto | 359/700 |
| 2006/0176587 A1 * | 8/2006 | Homme | 359/819 |
| 2007/0195430 A1 * | 8/2007 | Koyama | 359/703 |
| 2008/0002264 A1 * | 1/2008 | Noguchi | 359/694 |
| 2009/0195891 A1 * | 8/2009 | Ishizuka et al. | 359/700 |
| 2009/0225439 A1 * | 9/2009 | Iyoda et al. | 359/700 |
| 2009/0231732 A1 * | 9/2009 | Sasaki | 359/700 |
| 2009/0273847 A1 * | 11/2009 | Sakamoto | 359/685 |
| 2010/0020413 A1 * | 1/2010 | Sato | 359/700 |
| 2010/0020414 A1 * | 1/2010 | Kashiwaba | 359/700 |
| 2010/0033843 A1 * | 2/2010 | Katano | 359/699 |
| 2010/0067122 A1 * | 3/2010 | Yasuda | 359/700 |
| 2010/0103307 A1 * | 4/2010 | Iwasaki | 348/335 |
| 2010/0165481 A1 * | 7/2010 | Zou et al. | 359/700 |
| 2010/0208362 A1 * | 8/2010 | Kudoh | 359/695 |
| 2010/0214672 A1 * | 8/2010 | Yumiki et al. | 359/701 |
| 2010/0296176 A1 * | 11/2010 | Shinano et al. | 359/700 |
| 2010/0328785 A1 | 12/2010 | Nomura | |
| 2011/0001872 A1 * | 1/2011 | Honsho et al. | 348/362 |
| 2011/0026137 A1 * | 2/2011 | Kato | 359/700 |
| 2011/0032626 A1 * | 2/2011 | Tsuji | 359/699 |
| 2011/0038058 A1 * | 2/2011 | Fukai | 359/700 |
| 2011/0102910 A1 * | 5/2011 | Yoshii et al. | 359/700 |
| 2011/0128634 A1 * | 6/2011 | Iwasaki | 359/699 |
| 2011/0141580 A1 * | 6/2011 | Kato | 359/699 |

OTHER PUBLICATIONS

Office Action issued by USPTO on Apr. 28, 2014.

Office Action issued by Taiwan Intellectual Property Office on May 1, 2014.

* cited by examiner

LENS STRUCTURE

This application claims the benefit of Taiwan application Serial No. 100145154, filed Dec. 7, 2011, the subject matter of which is incorporated herein by reference.

BACKGROUND OF THE INVENTION

1. Field of the Invention

The invention relates in general to a lens structure, and more particularly to a lens structure with a prolonged optical zooming path.

2. Description of the Related Art

Along with the advance in technology, digital camera mechanism has been widely used in various digital products such as digital camera, digital video recorder, mobile phone, personal digital assistant (PDA). The digital camera mechanism comprises a lens structure and an image sensor. The lens structure focuses an image on the image sensor, and then the image sensor converts an optical image signal into an electrical signal.

Conventional lens structure comprises a number of barrels which move relatively to each other. A forwarding barrel of the barrels has a groove, which defines an optical zooming path. Through the groove, the forwarding barrel may move in a straight line to change the focus.

However, as the thickness of the lens structure is reduced, the length of the forwarding path of the forwarding barrel is subjected to the thickness of the barrel connected thereto, such that the length of the optical zooming is restricted indirectly.

SUMMARY OF THE INVENTION

The invention is directed to a lens structure with a prolonged optical zooming path.

According to an embodiment of the present invention, a lens structure is provided. The lens structure comprises a first barrel, at least one guider and a second barrel. The first barrel comprises a first groove and a first pin. The guider is slidably disposed into the first groove. The guider comprises a main body, a first limiting portion, and a second limit portion. The main body has a first end and a second end opposite to the first end. The first limiting portion is connected to the main body and set between the first end and the second end. The second limiting portion is connected to the second end. The second barrel moves with the guider through the first limiting portion and has a second groove. The first pin of the first barrel is slidably disposed into the second groove of the second barrel.

According to another embodiment of the present invention, a lens structure is provided. The lens structure comprises a first barrel, at least one guider, a first limiting portion and a second barrel. The first barrel comprises a first groove and a first pin. The guider slides in accordance with the first groove. The guider comprises a first connection portion, a second connection portion, and a second limit portion. The second connection portion is connected to the first connection portion. The second limiting portion is connected to one end of the first connection portion. The first limiting portion is disposed on the second connection portion. The second barrel comprises a second groove and a ring groove. The first limiting portion slides in accordance with the ring groove, such that the second barrel moves with the guider through the first limit portion, and the first pin of the first barrel is slidably disposed into the second groove of the second barrel.

The above and other aspects of the invention will become better understood with regard to the following detailed description of the preferred but non-limiting embodiment(s). The following description is made with reference to the accompanying drawings.

DETAILED DESCRIPTION OF THE INVENTION

Figure 1:
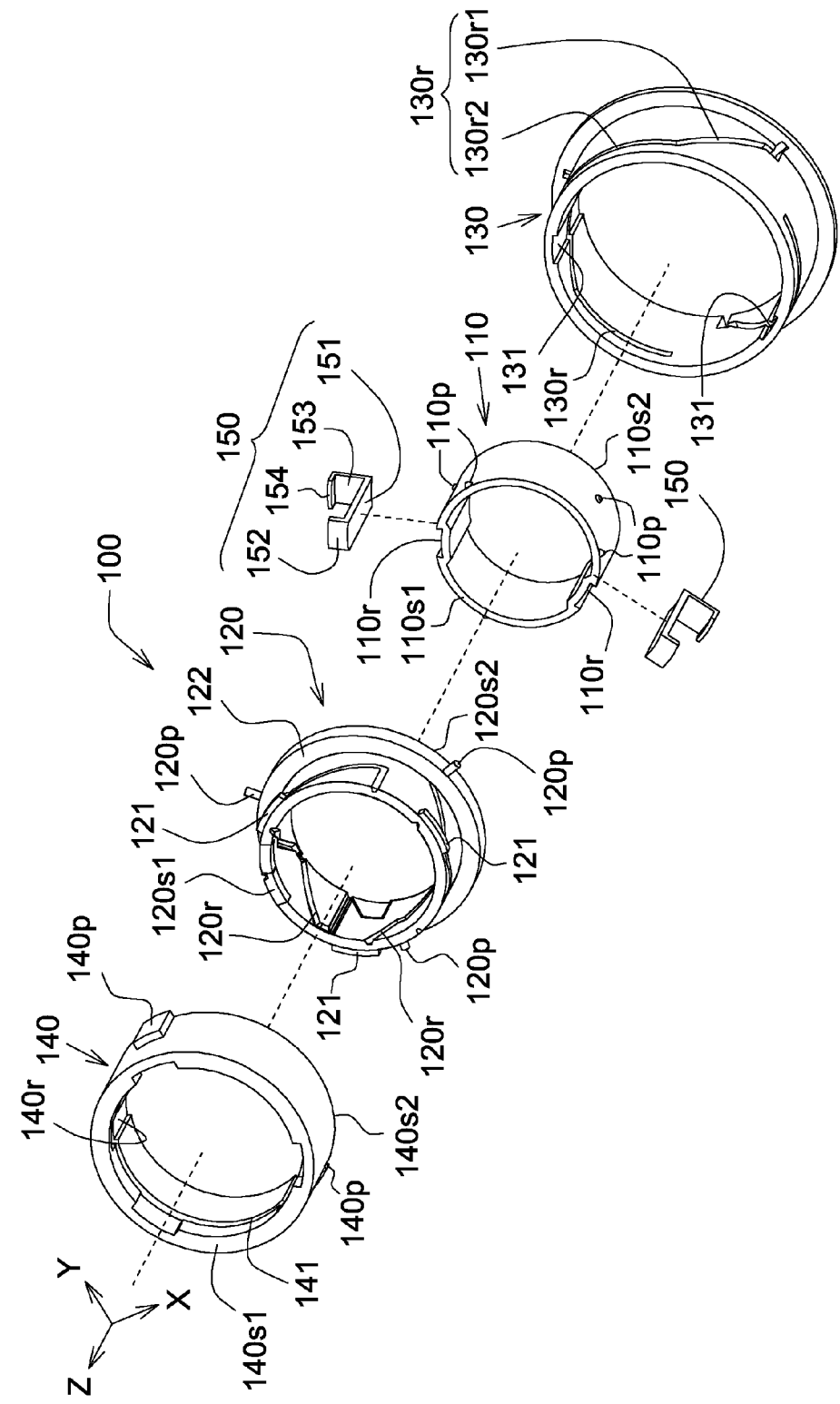
FIG. 1 shows a decomposition diagram of a lens structure according to an embodiment of the invention.

Referring to FIG. 1, a decomposition diagram of a lens structure according to an embodiment of the invention is shown.

The lens structure 100 may be widely used in various electronic devices with image capturing function, and may be realized by such as digital camera, digital video recorder, mobile phone or personal digital assistant (PDA).

The lens structure 100 comprises a first barrel 110, a second barrel 120, a third barrel 130, a fourth barrel 140 and at least one guider 150. In the present embodiment, the quantity of the guider 150 is exemplified by two, and the two guiders 150 are disposed in an asymmetric manner. That is, the circular angle between the two guiders 150 is not 180 degrees. In another embodiment, two guiders 150 may be disposed in a symmetric manner. That is, the circular angle between the two guiders 150 is 180 degrees.

The first barrel 110 has at least one first groove 110r and at least one first pin 110p. The first pin 110p of the first barrel 110 slides in accordance with the second groove 120r of the second barrel 120. In the present embodiment, the first groove 110r is realized by a forwarding slot. In addition, the quantity of the first pin 110p of the first barrel 110 corresponds to that of the second groove 120r of the second barrel 120, such as three or any other number.

The first barrel 110 has a first surface 110s1 and a second surface 110s2 opposite to the first surface 110s1. The first groove 110r extends to the second surface 110s2 from the first surface 110s1 of the first barrel 110. That is, the first groove 110*r* has two openings exposed on the first surface 110*s*1 and the second surface 110*s*2 respectively.

To elaborate the present embodiment in greater details, "forwarding slot" denotes the slot structure allowing the barrel to move in a straight line. For example, the first groove 110*r* only extends along the Z-axis, such that when the second barrel 120 rotates and then drives the first barrel 110 moved, the first barrel 110 and the guider 150 move with respect to each other in a straight line according to the first barrel 110 is restricted by the guider 150 (the guider 150 is restricted inside the first groove 110*r*). The Z-axis is such as the direction of the center axis of the barrel or the optical axis of the lens structure 100.

Although it is not illustrated in the diagram, the lens structure 100 may comprise a lens group disposed inside the first barrel 110. The lens group is formed by such as at least one concave lens and/or at least one convex lens. By moving the first barrel 110 in a straight line, the position of the lens group may thus be changed.

Figure 2:
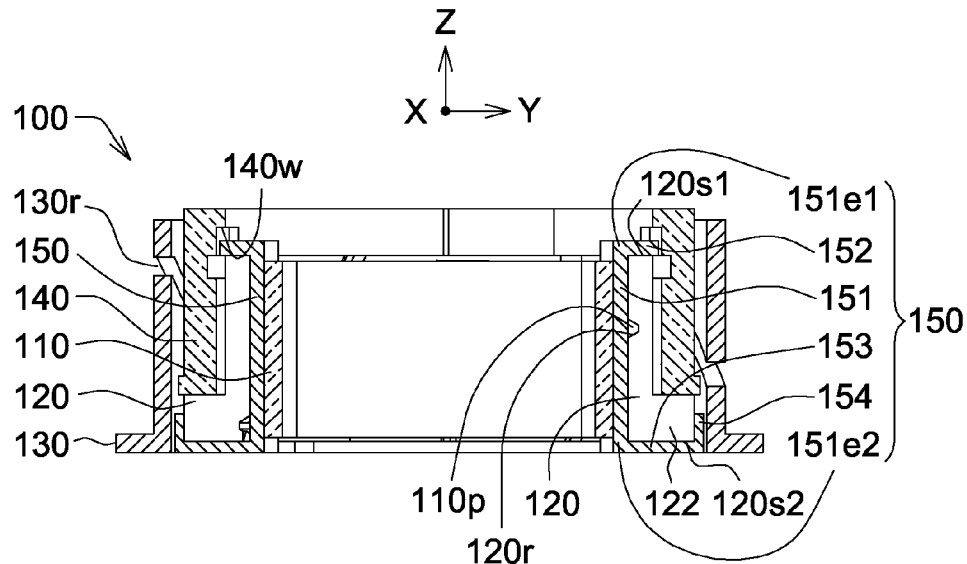
FIG. 2 shows a cross-sectional view of the lens structure of FIG. 1 being at a close end.

Referring to FIG. 2, a cross-sectional view of the lens structure of FIG. 1 being at a close end is shown. The guider 150 slides in accordance with the first groove 110*r* of the first barrel 110. According to the guider 150 is guided by the first groove 110*r*, the guider 150 may move in a straight line along the Z-axis.

The guider 150 comprises a main body 151, a first limiting portion 152 and a second limiting portion 153. The main body 151 has a first end 151*e*1 and a second end 151*e*2 opposite to the first end 151*e*1. The first limiting portion 152 is connected to the main body 151 and set between the first end 151*e*1 and the second end 151*e*2. In the present embodiment, the first limiting portion 152 is connected to the first end 151*e*1 of the main body 151, and the second limiting portion 153 is connected to the second end 151*e*2 of the main body 151.

As indicated in FIG. 2, the second barrel 120 is disposed inside the third barrel 130. The second barrel 120, being restricted by the first limiting portion 152 and drives the guider 150 to move. For example, the second barrel 120 is disposed between the first limiting portion 152 and the second limiting portion 153 for preventing the second barrel 120 from being detached from the guider 150 and enabling the guider 150 and the second barrel 120 to move with respect to each other. In the present embodiment, the second barrel 120 has a first surface 120*s*1 and a second surface 120*s*2 opposite to the first surface 120*s*1. The first surface 120*s*1 and the second surface 120*s*2 of the second barrel 120 are located between the first limiting portion 152 and the second limiting portion 153, but the present embodiment is not limited thereto.

As indicated in FIG. 2, the guider 150 further comprises a third limiting portion 154, the third limiting portion 154 is connected to the second limiting portion 153 and extends towards the first limiting portion 152, and the second barrel 120 is disposed among the first limiting portion 152, the second limiting portion 153 and the third limiting portion 154. In the present embodiment, since the third limiting portion 154 presses the flange 122 of the second barrel 120, such that when the second barrel 120 rotates, the shaking amplitude of the guider 150 is reduced by the flange 122 of the second barrel 120.

As indicated in FIG. 2, the second limiting portion 153 and the first limiting portion 152 are substantially parallel to each other. In another embodiment, the second limiting portion 153 and the first limiting portion 152 may not be parallel to each other. For example, an obtuse or acute angle is contained between the second limiting portion 153 and the first limiting portion 152.

By rotating the second barrel 120, the first barrel 110 is able to switch among a close end, a wide-angle end, and a telephoto end. The second barrel 120 may rotate around the Z-axis. The Z-axis is such as the direction of the center axis of the barrel or the optical axis of the lens structure 100.

Figure 3:
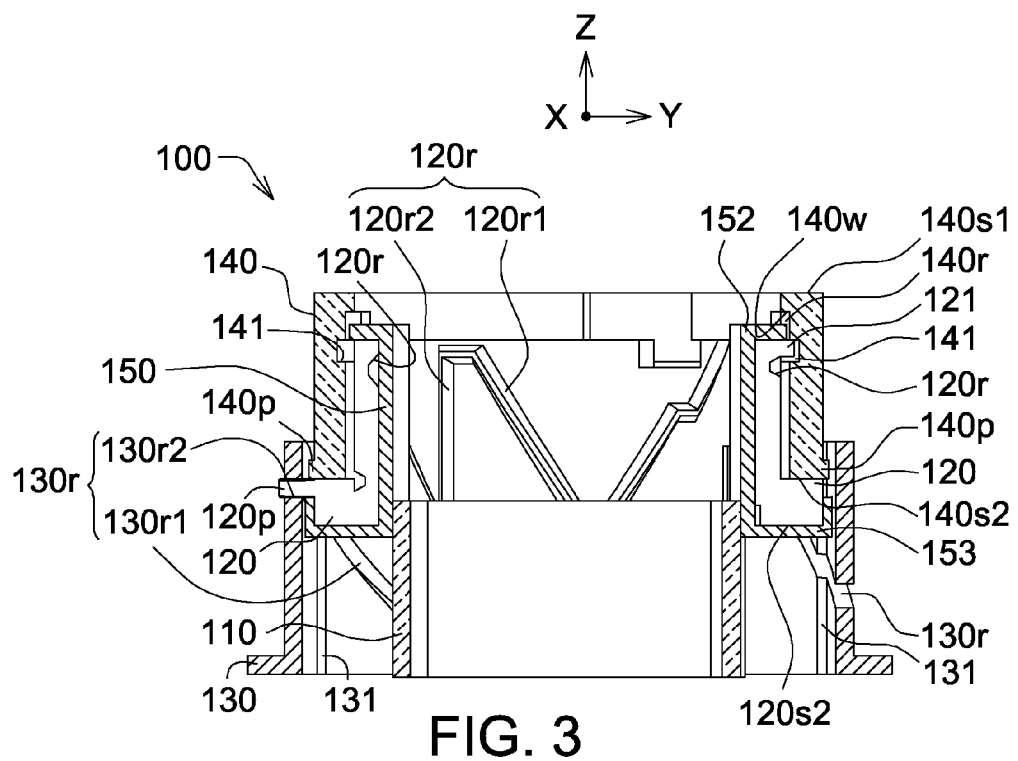
FIG. 3 shows a cross-sectional view of the lens structure of FIG. 1 being at a wide-angle end.

Referring to FIG. 3, a cross-sectional view of the lens structure of FIG. 1 being at a wide-angle end is shown. During the process in which the second barrel 120 of FIG. 1 rotates around the positive Z-axis and moves along the positive Z-axis in a straight line, the guider 150 is driven to move forward or backward in a straight line along the negative Z-axis. Furthermore, since the second barrel 120 is restricted by the first limiting portion 152, the second barrel 120 may drive the guider 150 to move when the second barrel 120 rotates. In the present embodiment, since the guider 150 moves in a straight line along the first groove 110*r* of the first barrel 110, the second barrel 120 may drive the guider 150 to move in a straight line. That is, during the process in which the second barrel 120 is transferred to the wide-angle end from the close end, the second barrel 120 rotates and moves in a straight line simultaneously. Besides, since the first barrel 110 is restricted by the straight line movement of the guider 150, the first barrel 110 moves in a straight line which follows the movement of the guider 150.

As indicated in FIG. 3, during the process in which the lens structure 100 is transferred to the wide-angle end from the close end, the first barrel 110 and the second barrel 120 respectively move in opposite directions. When the lens structure 100 is at the wide-angle end (FIG. 3), the first barrel 110 is protruded to be over the second surface 120*s*2 of the second barrel 120 and the guider 150.

As indicated in FIG. 3, the second barrel 120 has at least one second groove 120*r* and at least one second pin 120*p*. The second groove 120*r* of the second barrel 120 has at least one rotation slot 120*r*1 and at least one forwarding slot 120*r*2. Therefore, when the second barrel 120 rotates, the first pin 110*p* of the first barrel 110 is guided by the second groove 120*r* of the second barrel 120, such that the first barrel 110 performs a predetermined movement with respect to the second barrel 120. Moreover, the extension method of the second groove 120*r* exemplified in the present embodiment is only one example of the extension methods of the second groove 120*r*, and the extension method of the second groove 120*r* is not limited thereto.

As indicated in FIG. 3, the third barrel 130 has at least one third groove 130*r*. The second pin 120*p* of the second barrel 120 slides in accordance with the third groove 130*r* of the third barrel 130, such that the second barrel 120 is able to rotate and move forward or backward in a straight line with respect to the third barrel 130. In addition, the quantity of the second pin 120*p* of the second barrel 120 corresponds to that of the third groove 130*r* of the third barrel 130, such as three or any other number.

In the present embodiment, the third groove 130*r* has a first rotation slot 130*r*1 and a second rotation slot 130*r*2, wherein the first rotation slot 130*r*1 and the second rotation slot 130*r*2 are interconnected to each other. When the lens structure 100 is at the wide-angle end (FIG. 3), the second pin 120*p* of the second barrel 120 is disposed in the second rotation slot 130*r*2 of the third groove 130*r*.

To elaborate the present embodiment in greater details, "rotation slot" denotes the slot structure allowing the barrel to rotate. For example, the first rotation slot 130*r*1 extends along and around the Z-axis and is thus able to guide the barrel connected thereto to rotate and move in a straight line. In another example, the second rotation slot 130*r*2 only extends around the Z-axis, and is thus able to guide the barrel connected thereto to rotate only, wherein "extend around the Z-axis" means "extend along the outer circumferential direction of the barrel". In another embodiment, the second rotation slot 130r2 may simultaneously extend along and around the Z-axis. In addition, the extension method of the third groove 130r is not limited to the exemplification in the embodiments of the invention.

As indicated in FIG. 3, the third barrel 130 further has at least one fifth groove 131, and the fourth barrel 140 comprises at least one fourth pin 140p. The fourth pin 140p and the guider 150 are slidably set to the fifth groove 131. That is, the fourth pin 140p and the guider 150 share the fifth groove 131. In the present embodiment, the fifth groove 131 is such as a forwarding slot, such that the fourth barrel 140 and the guider 150 may only move in a straight line along the fifth groove 131. Thus, since the first barrel 110 is restricted by the guider 150, the first barrel 110 may only move in a straight line with the guider 150.

As indicated in FIG. 3, the second barrel 120 comprises at least one protrusion portion 121, the fourth barrel 140 has a ring groove 141, and the protrusion portions 121 of the second barrel 120 is slidably set to the ring groove 141 of the fourth barrel 140. In the present embodiment, two protrusion portions 121 are separately disposed, and are adjacent to the first surface 120s1 of the second barrel 120. In another embodiment, the protrusion portions 121 may be realized by a closed ring or an open ring structure. The ring groove 141 is such as a rotation slot. When the protrusion portions 121 is slidably set inside the ring groove 141, the second barrel 120 drives the fourth barrel 140 to move with respect to each other.

As indicated in FIG. 3, the fourth barrel 140 further has at least one fourth groove 140r to which the guider 150 is slidably set. In the present embodiment, the fourth groove 140r is such as a forwarding slot, such that the guider 150 may only move in a straight line along the fourth groove 140r.

The fourth barrel 140 has a first surface 140s1 and a second surface 140s2 opposite to the first surface 140s1. The fourth groove 140r extends towards the first surface 140s1 from the second surface 140s2. In the present embodiment, the fourth groove 140r does not extend to the first surface 140s1 but forms a side wall 140w on one end of the fourth groove 140r. In another embodiment, the fourth groove 140r may extend to the first surface 140s1 from the second surface 140s2. That is, the fourth groove 140r has two openings exposed on the first surface 140s1 and the second surface 140s2.

Figure 4:
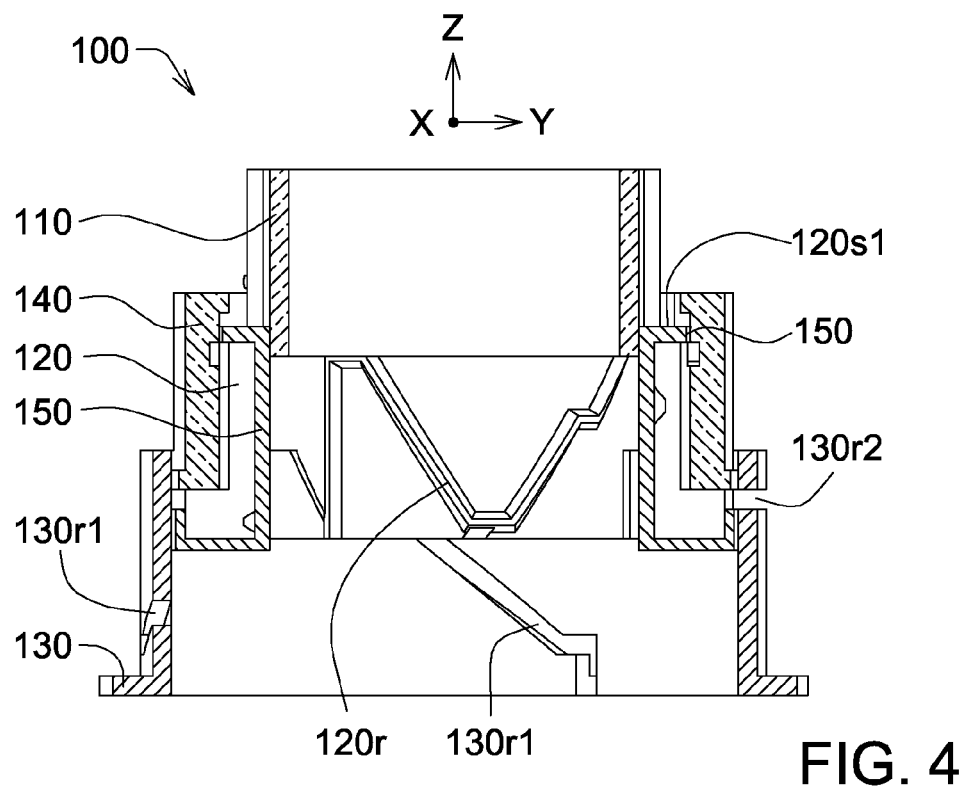
FIG. 4 shows a cross-sectional view of the lens structure of FIG. 1 being at a telephoto end.

Referring to FIG. 4, a cross-sectional view of the lens structure of FIG. 1 being at a telephoto end is shown. When the second barrel 120 of FIG. 3 continues to rotate, the second pin 120p of the second barrel 120 rotates along the third groove 130r. In the present embodiment, during the process in which the second barrel 120 is transferred to the telephoto end from the wide-angle end, the second barrel 120, being guided by the second rotation slot 130r2, only rotates but does not move forward or backward in a straight line along the Z-axis, but the invention is not limited thereto.

In another embodiment, the second barrel 120 may rotate and/or move in a straight line according to the extension method of the third groove 130r, and is not limited to the embodiments of the invention.

Referring to both FIG. 3 and FIG. 4. During the process in which the second barrel 120 of FIG. 3 continues to rotate to the telephoto end of FIG. 4, the first pin 110p of the first barrel 110 is guided by the second groove 120r of the second barrel 120, such that the first barrel 110 moves in a straight line along the positive Z-axis until the telephoto end of FIG. 4 is reached. Meanwhile, the first barrel 110 is protruded to be over the first surface 120s1 of the second barrel 120 and the guider 150.

When the second barrel 120 rotates, the first barrel 110 may switch between the position at which the first barrel 110 is protruded to be over the first surface 120s1 of the second barrel 120 and the position at which the first barrel 110 is protruded to be over the second surface 120s2, such that the movement path of the first barrel 110 is prolonged. That is, the overall optical zooming path is prolonged.

Although the guiders 150 are separately disposed as exemplified above, the guiders 150 may also be connected and the details are elaborated below.

Figure 5:
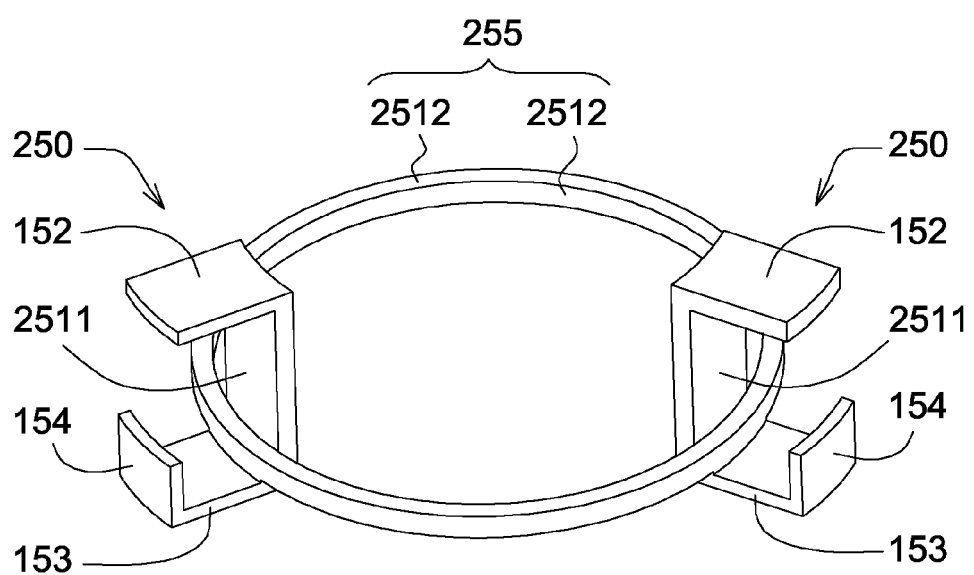
FIG. 5 shows an external view of a guider according to another embodiment of the invention.

Referring to FIG. 1 and FIG. 5. FIG. 5 shows an external view of a guider according to another embodiment of the invention. The lens structure 200 comprises at least one guider 250, a first barrel 110, a second barrel 120, a third barrel 130 and a fourth barrel 140.

In the present embodiment, the quantity of the guider 250 is exemplified by two. The two guiders 250 are integrally formed in one piece, and may be formed by using the injection molding technology, but the invention is not limited thereto. In another embodiment, the parts of the guiders 250 may be manufactured separately and then are assembled or bonded to form an integral structure.

The main body 251 of each guider 250 comprises a first connection portion 2511 and a second connection portion 2512. The first limiting portion 152 and the second limiting portion 153 are connected to the corresponding first connection portion 2511. The second connection portion 2512 is connected to the first connection portion 2511. Two adjacent second connection portions 2512 are interconnected to form a ring piece 255. In another embodiment, the quantity of the guider 250 may be singular, and the second connection portion 2512 of the singular guider 250 may form a ring piece as well.

Although the first limiting portion 152 of FIG. 1 is connected to the first end 151e1 of the main body 151 in the above exemplification, the first limiting portion 152 of FIG. 1 may also be connected to the second connection portion 2512 or the first connection portion 2511 of FIG. 2 as exemplified below.

Figure 6:
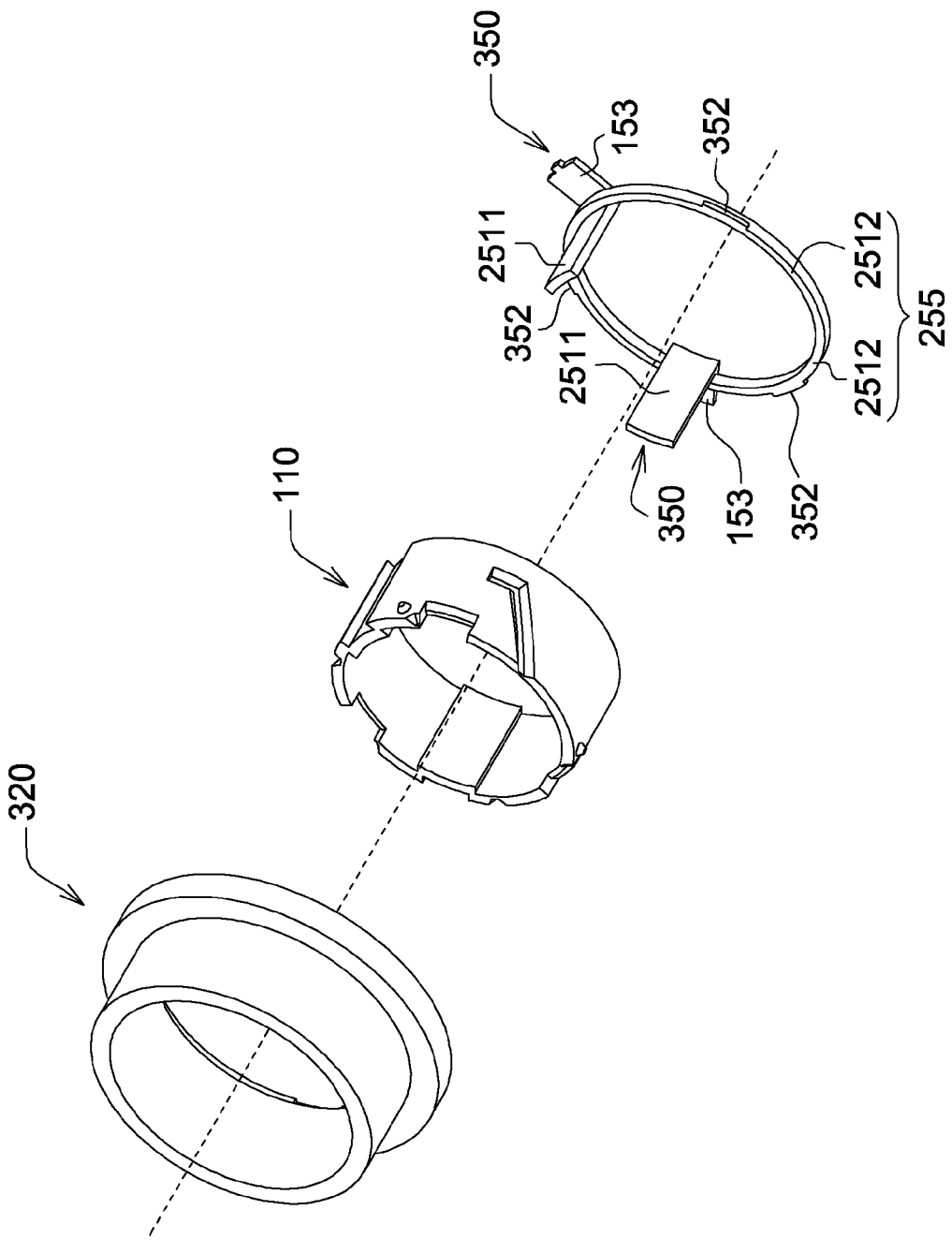
FIG. 6 shows a decomposition diagram of a first barrel, a second barrel and a guider according to another embodiment of the invention.

Referring to FIG. 6, a decomposition diagram of a first barrel, a second barrel and a guider according to another embodiment of the invention is shown.

The lens structure 300 comprises at least one guider 350, a first barrel 110, a second barrel 320, a third barrel 130 (not illustrated), a fourth barrel 140 (not illustrated) and at least one first limiting portion 352. The structure of the second barrel 320 is similar to that of the second barrel 120.

In the present embodiment, the quantity of the guider 350 is exemplified by two. Two guiders 350 are integrally formed in one piece, but the invention is not limited thereto. In another embodiment, the parts of the guiders 350 may be manufactured separately and then are assembled or bonded to form an integral structure.

Each guider 350 comprises a first connection portion 2511, a second connection portion 2512, and a second limiting portion 153. The first connection portion 2511 has a first end 2511e1 and a second end 2511e2 opposite to the first end 2511e1. The second limiting portion 153 is connected to the second end 2511e2 of the first connection portion 2511. The second connection portion 2512 is connected to the first connection portion 2511. Two adjacent second connection portions 2512 are interconnected to form a ring piece 255. In another embodiment, the quantity of the guider 350 may be singular, and the second connection portion 2512 of the singular guider 350 may form a ring piece as well. In the present embodiment, the first limiting portion 352 may be disposed on the second connection portion 2512 of the main body 151. In another embodiment, several first limit portions 352 may be separately disposed on the second connection portion 2512. In another embodiment, the first limiting portion 352 is a ring structure disposed on the second connection portion 2512.

In the present embodiment, the first limiting portion 352 is disposed on the second connection portion 2512. The quantity of the first limiting portion 352 may be any number, and is exemplified by three in the present embodiment.

Figure 7:
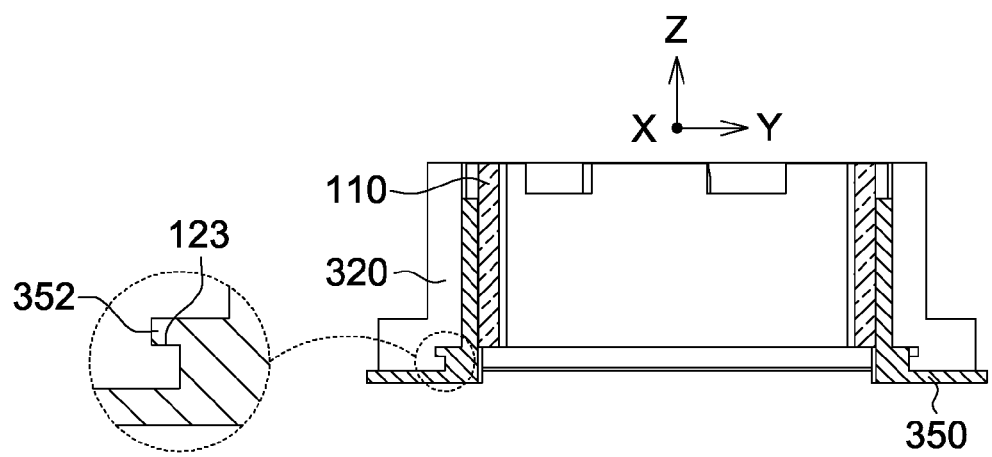
FIG. 7 shows a cross-sectional view of the guider, the first barrel and the second barrel of FIG. 6 being at a close end.

Referring to FIG. 7, a cross-sectional view of the guider, the first barrel and the second barrel of FIG. 6 being at a close end is shown. FIG. 7 only illustrates the guider 350, the first limiting portion 352, the first barrel 110 and the second barrel 320. The second barrel 320 has a ring groove 123 to which the first limiting portion 352 of the guider 350 is slidably set, such that the second barrel 320 being restricted by the first limiting portion 352 moves with respect to the guider 350.

Figure 8:
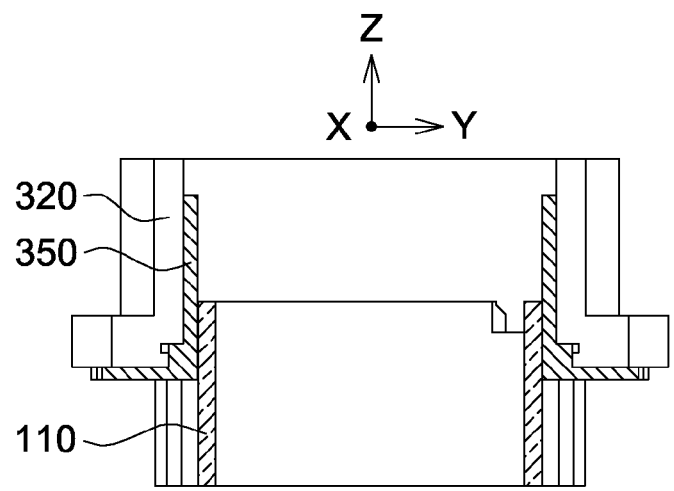
FIG. 8 shows a cross-sectional view of the guider, the first barrel and the second barrel of FIG. 6 being at a wide-angle end.

Referring to both FIG. 7 and FIG. 8. FIG. 8 shows a cross-sectional view of the guider, the first barrel and the second barrel of FIG. 6 being at a wide-angle end. FIG. 8 only illustrates the guider 350, the first barrel 110 and the second barrel 320. Since the first limiting portion 352 and the ring groove 123 are mutually restricted, the guider 350 accordingly moves forward or backward in a straight line when the second barrel 320 of FIG. 7 moves in a straight line along the positive Z-axis.

Figure 9:
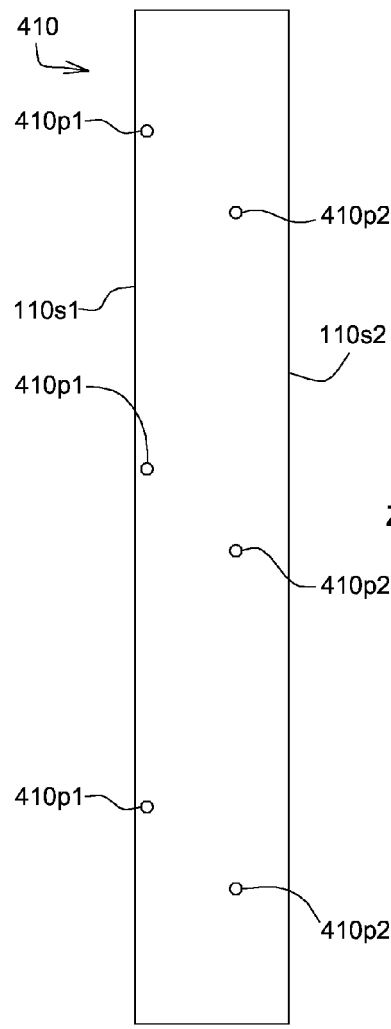
FIG. 9 shows an expansion diagram of a first barrel of a lens structure according to another embodiment of the invention.

Referring to FIG. 9, an expansion diagram of a first barrel of a lens structure according to another embodiment of the invention is shown. The first barrel 410 has a first pin 410p1 and a second pin 410p2, wherein, the first pin 410p1 and the second pin 410p2 may be respectively adjacent to the first surface 110s1 and the second surface 110s2 of the first barrel 410.

In the present embodiment, the quantity of the first pin 410p1 is the same with that of the second pin 410p2, and is such as three or any other numbers. Several first pin 410p1 form a first pin group, and several second pin 410p2 form a second pin group. Besides, in the above embodiment, the structure of one group of first pins 110p of the first barrel 110 may be similar to that of the first pin 410p1 and the second pin 410p2 of the first barrel 410. Furthermore, other structure (such as the first groove 110r) of the first barrel 410 may be similar to that of the first barrel 110, and the similarities are not repeated here.

Figure 10:
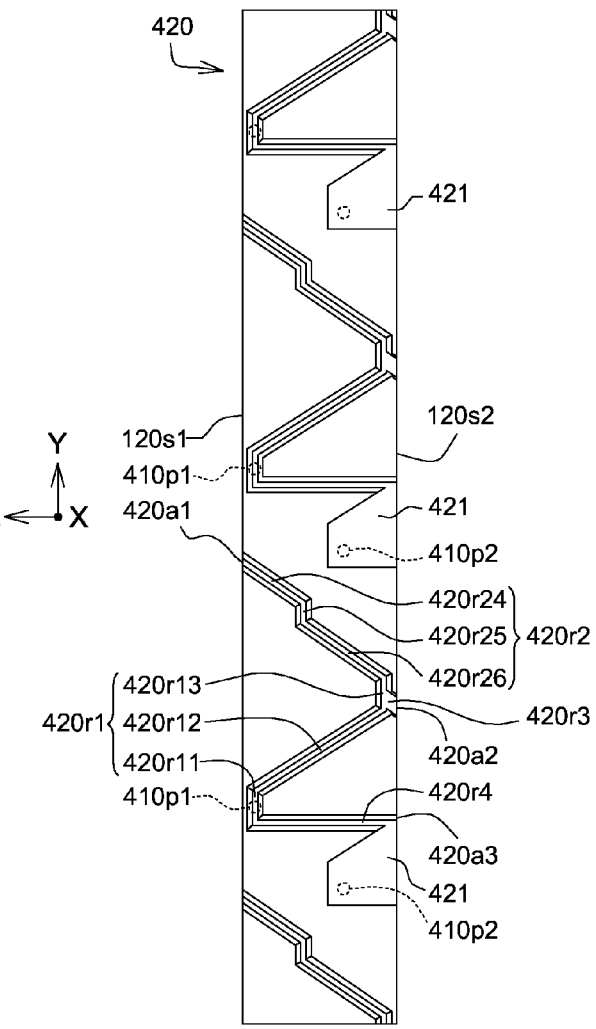
FIG. 10 shows an expansion diagram of a second barrel of a lens structure according to another embodiment of the invention.

Referring to FIG. 10, an expansion diagram of a second barrel of a lens structure according to another embodiment of the invention is shown.

The second barrel 420 has a first surface 120s1, a second surface 120s2, at least one accommodation recess 421 and at least one continuous groove 420r. The first surface 120s1 and the second surface 120s2 are opposite to each other. The continuous groove 420r has openings 420a1 and 420a2 respectively exposed on the first surface 120s1 and the second surface 120s2.

In the present embodiment, the quantity of the continuous groove 420r is the same with that of the accommodation recess 421, and is such as three or any other number. Besides, in the above embodiment, the structure of the second groove 120r of the second barrel 120 may be similar to that of the continuous groove 420r of the second barrel 420. Furthermore, other structure of the second barrel 420 may be similar to that of the second barrel 120, and the similarities are not repeated here.

As indicated in FIG. 10, the continuous groove 420r comprises a first sub-groove 420r1, a second sub-groove 420r2 and a third sub-groove 420r3, the first sub-groove 420r1 is connected to the second sub-groove 420r2, the third sub-groove 420r3 extends to the second surface 120s2 of the second barrel 420 from the second sub-groove 420r2, and the second sub-groove 420r2 extends to the first surface 120s1 of the second barrel 420.

As indicated in FIG. 10, the continuous groove 420r further comprises a fourth sub-groove 420r4, which is connected to the first sub-groove 420r1 and extends to the second surface 120s2 of the second barrel 420 for exposing an opening 420a3 on the second surface 120s2, such that the first pin 410p1 of the first barrel 410 enters the continuous groove 420r through the opening 420a3 of the fourth sub-groove 420r4. Thus, the assembly is thus made easier and more convenient.

As indicated in FIG. 10, when the first barrel 410 and the second barrel 420 are at the close end, the first pin 410p1 set in the continuous groove 420r and the second pin 410p2 set in accommodation recess 421. In the present embodiment, the first pin 410p1 is adjacent to the junction between the fourth sub-groove 420r4 and the first sub-groove 420r1. Moreover, the relative positions between the first barrel 410 and the second barrel 420 in the close end after assembly are similar to that the first barrel 410 and the second barrel 420 of FIG. 2, and the similarities are not repeated here.

As indicated in FIG. 10, the first sub-groove 420r1 comprises a first rotation slot 420r11, a second rotation slot 420r12 and a third rotation slot 420r13. The second rotation slot 420r12 connects the first rotation slot 420r11 and the third rotation slot 420r13, and extends between the first surface 120s1 and the second surface 120s2. The first rotation slot 420r11 and the third rotation slot 420r13 only extend around the Z-axis of the second barrel 420, and the third rotation slot 420r13 is connected to the third sub-groove 420r3. In the present embodiment, the first rotation slot 420r11 and the third rotation slot 420r13 extend around the Z-axis, and the second rotation slot 420r12 simultaneously extends around and along the Z-axis (oblique extension), but the present embodiment is not limited thereto.

Figures 11, 12:
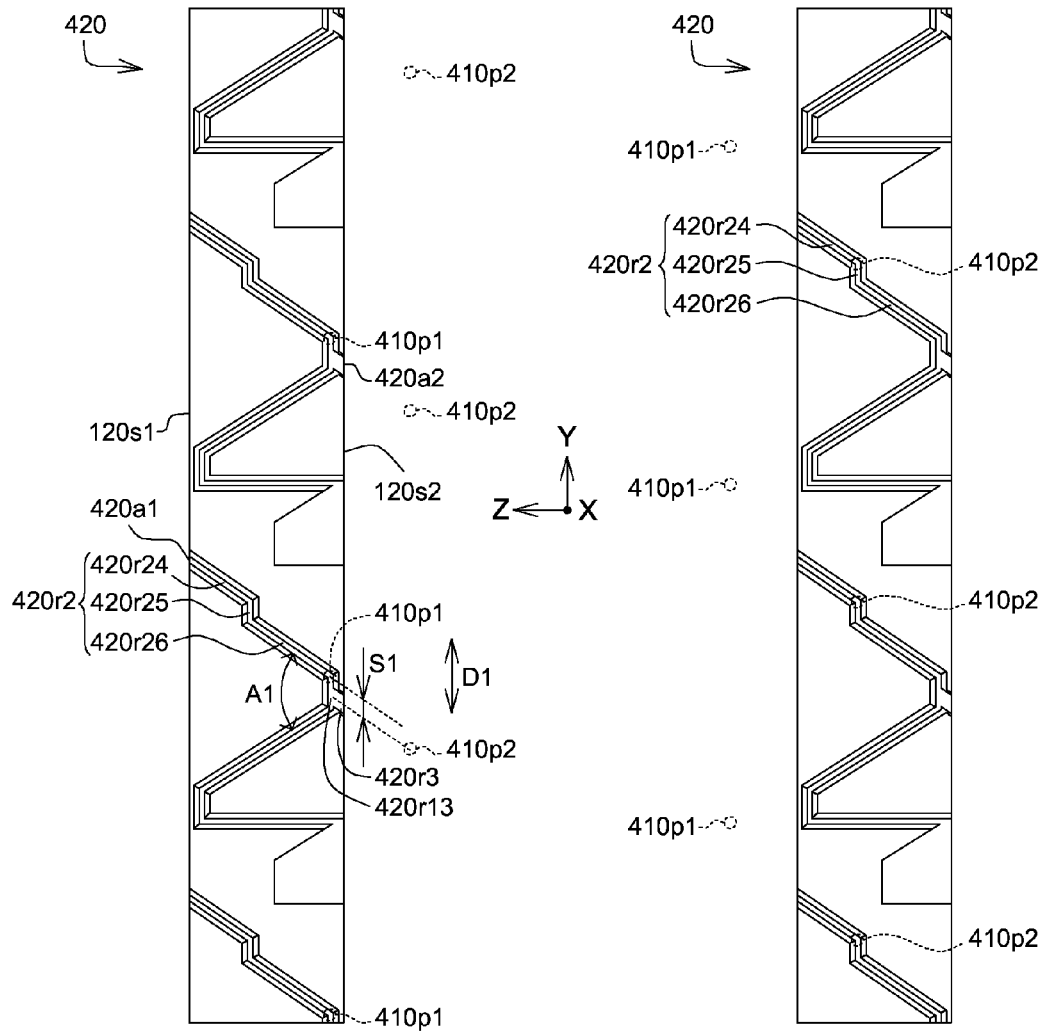
FIG. 11 shows a schematic diagram of the first barrel of FIG. 9 and the second barrel of FIG. 10 being at a wide-angle end.
FIG. 12 shows a schematic diagram of the first barrel of FIG. 9 and the second barrel of FIG. 10 being at a telephoto end.

Referring to FIG. 11, a schematic diagram of the first barrel of FIG. 9 and the second barrel of FIG. 10 being at a wide-angle end is shown. Moreover, the relative positions between the first barrel 410 and the second barrel 420 in the wide-angle end after assembly are similar to that the first barrel 110 and the second barrel 120 of FIG. 3, and the similarities are not repeated here.

During the process in which the first barrel 410 and the second barrel 420 are transferred to the wide-angle end (FIG. 11) form the close end (FIG. 10), the first pin 410p1 moves inside of the continuous groove 420r, but the second pin 410p2 moves to the outside of the second barrel 420 from the accommodation recess 421.

As indicated in FIG. 11, when the first barrel 410 and the second barrel 420 are at the wide-angle end, the first pin 410p1 set inside the continuous groove 420r and the second pin 410p2 set outside the second barrel 420.

As indicated in FIG. 11, the second sub-groove 420r2 comprises a fourth rotation slot 420r24, a fifth rotation slot 420r25 and a sixth rotation slot 420r26. The fourth rotation slot 420r24 connects the fifth rotation slot 420r25 and extends to the first surface 120s1 for exposing an opening 420a1 on the first surface 120s1. The fifth rotation slot 420r25 only extends around the Z-axis of the second barrel 420, and the sixth rotation slot 420r26 connects the fifth rotation slot 420r25 and the third rotation slot 420r13 and extends between the first surface 120s1 and the second surface 120s2.

In the present embodiment, the fifth rotation slot 420r25 extends around the Z-axis, but the fourth rotation slot 420r24 and the sixth rotation slot 420r26 simultaneously extend around and along the Z-axis (oblique extension), but the present embodiment is not limited thereto. Moreover, in the present embodiment, an acute angle A1 is contained between the sixth rotation slot 420r26 and the second rotation slot 420r12, but the present embodiment is not limited thereto.

In the present embodiment, when the first barrel 410 and the second barrel 420 are at the wide-angle end, the first pin 410p1 is adjacent to the junction between the sixth rotation slot 420r26 and the third rotation slot 420r13.

As indicated in FIG. 11, in the present embodiment, the fourth rotation slot 420r24 is substantially parallel to the sixth rotation slot 420r26, and the third sub-groove 420r3 is substantially parallel to the sixth rotation slot 420r26.

As indicated in FIG. 11, the fourth rotation slot 420r24 is separated from the sixth rotation slot 420r26 by a distance S1 along a direction D1, and the third sub-groove 420r3 may be separated from the sixth rotation slot 420r26 by the same distance S1 along the same direction D1, wherein the direction D1 is such as a direction around the Z-axis. In addition, the first pin 410p1 of the first barrel 410 may be separated from the second pin 410p2 by the same distance S1 along the direction D1, such that the first pin 410p1 and the second pin 410p2 are smoothly and slidably set to the continuous groove 420r.

Referring to FIG. 12, a schematic diagram of the first barrel of FIG. 9 and the second barrel of FIG. 10 being at a telephoto end is shown. Moreover, the relative positions between the first barrel 410 and the second barrel 420 in the telephoto end after assembly are similar to that the first barrel 110 and the second barrel 120 of FIG. 4.

During the process in which the first barrel 410 and the second barrel 420 are transferred to the telephoto end (FIG. 12) from the wide-angle end (FIG. 11), the first pin 410p1 is moved to the outside of the second barrel 420 from the inside of the continuous groove 420r through the opening 420a1, and the second pin 410p2 is moved to the inside of the continuous groove 420r from the outside of the second barrel 420 through the opening 420a2.

As indicated in FIG. 12, when the first barrel 410 and the second barrel 420 are at the telephoto end, the first pin 410p1 set outside the second barrel 420 and the second pin 410p2 set inside the continuous groove 420r, and is such as adjacent to the junction between the fourth rotation slot 420r24 and the fifth rotation slot 420r25.

According to the lens structure disclosed in the above embodiments of the invention, when the second barrel rotates, the first barrel may switch between the position at which the first barrel is protruded to be over the first surface of the second barrel and the position at which the first barrel is protruded to be over the second surface, such that the movement path of the first barrel is prolonged.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A lens structure with an optical zooming path and an axis, comprising:
a first barrel comprising a first surface perpendicular to the axis, a second surface opposite to the first surface, a first groove extending from the first surface to the second surface and forming openings respectively in the first surface and the second surface, and a first pin;
two or more than two guiders slidably disposed in the first groove and movable to protrude over the first surface and/or the second surface through the openings therein, each of the guiders comprising:
a main body comprising a first end and a second end;
a first limiting portion connected to the main body and set between the first end and the second end; and
a second limiting portion connected to the second end; and
a second barrel moving with the guiders to slide along the first groove in accordance with the first limiting portion of each of the guiders, and the second barrel comprising a second groove for the first pin of the first barrel to slide.

2. The lens structure according to claim 1, wherein the second barrel comprises a third surface and a fourth surface, and the third surface and the fourth surface are located between the first limiting portion and the second limiting portion.

3. The lens structure according to claim 1, wherein the first limiting portion is connected to the first end of the main body, and the second barrel is set between the first limiting portion and the second limiting portion.

4. The lens structure according to claim 1, further comprising a third barrel, wherein the second barrel is disposed inside of the third barrel, and a second pin of the second barrel slides in accordance with a third groove of the third barrel.

5. The lens structure according to claim 4, wherein the lens structure further comprises a fourth barrel, and the guiders slide in accordance with a fourth groove of the fourth barrel.

6. The lens structure according to claim 5, wherein the fourth barrel further comprises a third pin, the third barrel further comprises a fifth groove, and the third pin and the guiders slide in accordance with the fifth groove.

7. The lens structure according to claim 1, wherein the lens structure further comprises a third barrel, and a protrusion portion of the second barrel slides in accordance with a ring groove of the third barrel.

8. The lens structure according to claim 1, wherein each of the guiders further comprises a third limiting portion, which is connected to the second limiting portion and extends towards the first limiting portion.

9. The lens structure according to claim 8, wherein the second barrel is set among the first limiting portion, the second limiting portion and the third limiting portion.

10. The lens structure according to claim 1, wherein the main body of each of the guiders further comprises a first connection portion, and the first limiting portion and the second limiting portion are connected to the first connection portion.

11. The lens structure according to claim 10, wherein the main body of each of the guiders further comprises at least one second connection portion, and the second connection portion is set on the first connection portion.

12. The lens structure according to claim 11, wherein the first limiting portion is set on the second connection portion.

13. The lens structure according to claim 10, wherein the second barrel has a ring groove, and the first limiting portion slides in according with the ring groove.

14. The lens structure according to claim 10, further comprising a ring piece formed by a plurality of second connection portions, wherein the plurality of second connection portions connect to the first connection portion, and the first limiting portion is set on the first connection portion.

15. A lens structure with an optical zooming path and an axis, comprising:
- a first barrel comprising a first surface perpendicular to the axis, a second surface opposite to the first surface, and a first groove extending from the first surface to the second surface and forming openings respectively in the first surface and the second surface;
- two or more than two guiders slidably set to the first groove and movable to protrude over the first surface and/or the second surface through the openings therein, each of the guiders comprising:
  - a first connection portion;
  - a second connection portion connected to the first connection portion;
  - a first limiting portion; and
  - a second limiting portion connected to the first limiting portion and one end of the first connection portion; and
- a second barrel comprising a second groove and a ring groove;
- wherein the first limiting portion slides in accordance with the ring groove, and the second barrel follows the guiders to slide along the first groove by the first limiting portion of each of the guiders.

16. The lens structure according to claim 15, wherein each of the guiders further comprises a third limiting portion, which is connected to the corresponding second limiting portion and extends towards the corresponding first limiting portion, and the second barrel is set among the first limiting portions, the second limiting portions and the third limiting portions.

17. A lens structure with an optical zooming path, comprising a first barrel, a second barrel and a third barrel, the first barrel comprises a first surface, a second surface opposite to the first surface, a first groove and a first pin, the second barrel comprises a second groove and a second pin, the third barrel comprises a third groove, the first pin slides along the second groove, the second pin slides along the third groove, wherein the lens structure comprises:
- two or more than two guiders, each comprising:
  - a main body comprising a first end and a second end;
  - a first limiting portion connected to the main body and set between the first end and the second end; and
  - a second limiting portion connected to the second end;
- wherein, the first groove extends from the first surface to the second surface, and the guiders are slidably set to the first groove; and
- wherein, the second barrel moves with the guiders to slide along the first groove in accordance with the first limiting portion of each of the guiders.

18. The lens structure according to claim 17, wherein each of the guiders further comprises a third limiting portion, which is connected to the second limiting portion and extends towards the first limiting portion.

19. The lens structure according to claim 18, wherein the second barrel is set among the first limiting portion, the second limiting portion and the third limiting portion.

* * * * *